United States Patent
Farrington et al.

(10) Patent No.: US 6,459,600 B2
(45) Date of Patent: Oct. 1, 2002

(54) METHOD OF CONNECTING SYNCHRONOUS RECTIFIER MODULES IN PARALLEL WITHOUT OUTPUT VOLTAGE FAULTS

(75) Inventors: Richard W. Farrington, Heath; Claes Svardsjo, Richardson; William Hart, Plano, all of TX (US)

(73) Assignee: Ericsson, Inc., Richardson, TX (US)

( * ) Notice: Subject to any disclaimer, the term of this patent is extended or adjusted under 35 U.S.C. 154(b) by 9 days.

(21) Appl. No.: 09/772,098

(22) Filed: Jan. 27, 2001

Related U.S. Application Data
(60) Provisional application No. 60/178,683, filed on Jan. 28, 2000.

(51) Int. Cl.[7] .............................................. H02M 2/127
(52) U.S. Cl. ........................................ 363/89; 363/127
(58) Field of Search .............................. 363/17, 21.06, 363/21.14, 89, 127

(56) References Cited

U.S. PATENT DOCUMENTS

| | | | |
|---|---|---|---|
| 4,716,514 A | 12/1987 | Patel | 363/127 |
| 4,922,404 A | * 5/1990 | Ludwig et al. | 363/89 |
| 5,038,266 A | * 8/1991 | Callen et al. | 363/89 |
| 5,274,543 A | 12/1993 | Loftus, Jr. | 363/127 |
| 5,424,932 A | * 6/1995 | Inou et al. | 363/127 |
| 5,590,032 A | 12/1996 | Bowman et al. | 363/15 |
| 5,625,541 A | 4/1997 | Rozman | 363/21 |
| 5,742,491 A | 4/1998 | Bowman et al. | 363/21 |
| 5,841,641 A | * 11/1998 | Faulk | 363/89 |
| 5,907,481 A | 5/1999 | Svardsjo | 363/25 |
| 5,946,207 A | * 8/1999 | Schoofs | 363/127 |
| 5,956,245 A | 9/1999 | Rozman | 363/89 |
| 6,038,148 A | 3/2000 | Farrington et al. | 363/21 |
| 6,101,104 A | * 8/2000 | Eng | 363/127 |
| 6,111,769 A | 8/2000 | Zhang et al. | 363/127 |
| 6,128,206 A | 10/2000 | Sun et al. | 363/127 |
| 6,166,927 A | 12/2000 | Farrington et al. | 363/25 |
| 6,169,683 B1 | 1/2001 | Farrington | 363/127 |
| 6,191,964 B1 | * 2/2001 | Boylan et al. | 363/89 |
| 6,297,970 B2 | * 10/2001 | Hemena et al. | 363/89 |

FOREIGN PATENT DOCUMENTS

| | | | |
|---|---|---|---|
| EP | 0 529 180 A1 | 3/1993 | H02M/3/335 |
| JP | 06343262 | 12/1994 | H02M/3/28 |
| JP | 08289538 | 11/1996 | H02M/3/28 |
| JP | 10225114 | 8/1998 | H02M/3/28 |
| JP | 10243647 | 9/1998 | H02M/3/28 |

OTHER PUBLICATIONS

"A MOSFET Resonant Synchronous Rectifier for High-frequency DC/DC Converters," Wojclech A. Tabisz, Fred C. Lee and Dan Y. Chen; IEEE Publication CH2873-8/90/0000; pp. 769-779.

"Constant Frequency, Forward Converter With Resonant Transition," Ionel Dan Jitaru; HFPC June 1991 Proceedings pp. 282-292.

(List continued on next page.)

*Primary Examiner*—Jeffrey Sterrett
(74) *Attorney, Agent, or Firm*—Daniel J. Chalker; Sanford E. Warren, Jr.; Gardere Wynne Sewell LLP

(57) ABSTRACT

The present invention provides a method for preventing a fault condition in a DC-DC converter (10, 20, 50) having a first secondary winding (Ns1) coupled to a first synchronous rectifier (SQ1) and a second secondary winding (Ns2) coupled to a second synchronous rectifier (SQ2). The first synchronous rectifier (SQ1) is turned on based on a voltage across the first secondary winding (Ns1) and is turned off based on a first driver signal. The second synchronous rectifier (SQ2) is turned on based on a voltage across the second secondary winding (Ns2) and is turned off based on a second driver signal. The present invention also provides a DC-DC converter (10, 20, 50) wherein a first control circuit is coupled to and controls the first synchronous rectifier (SQ1) pursuant to the method described above, and a second control circuit is coupled to and controls the second synchronous rectifier (SQ2) pursuant to the method described above.

20 Claims, 4 Drawing Sheets

OTHER PUBLICATIONS

"Several Alternatives for Low Output Voltage on Board Converters;" J.A. Cobos, P. Alou, O, Garcis, R. Prieto, J. Uceda and M. Rascon; presented at the APEC '98 Thirteenth Annual Applied Power Electronics Conference and Exposition, Feb. 15–19, 1998, Anaheim, California, pp. 163–169.

"A Highly Efficient, Low–profile 300–W Power Pack for Telecommunications;" N. Murakami, I. Yumoto, T. Yachi, K. Maki; presented at the APEC '94 Ninth Annual Applied Power Electronics Conference and Exposition, Feb. 13–17, 1994, Orlando, Florida, pp. 786–792.

A Compact Highly Efficient 50–W On–Board Power Supply for Telecommunications Systems; Nobuhiko Yamashita, Naoki Murakami and Toshiaki Yachi; presented at the APEC '95 Tenth Annual Applied Power Electronics Conference and Exposition, Mar. 5–9, 1995, Dallas, Texas, pp. 297–302.

"Synchronous Rectifiers vs. Schottky Diodes in a Buck Topology for Low Voltage Applications;" Ognjen Djekic and Miki Brkovic; presented at the 28th Annual IEEE Power Electronics Specialist Conference; pp. 1374–1380, May 1997.

"High–Efficiency Switching Power Supply Unit with Synchronous Rectifier;" Y. Nakayashiki, H. Shimamori, T/ Satch, T. Ghno, S. Yamashita, K. Fuchigami, T. Yamamoto; IEEE Publication 0–7803–3069, Mar. 1998, pp. 398–403.

"Analysis of Abnormal Phenomena Cause by Synchronous Rectifiers in a Parallel Converter System;" Teruhiko Kohama, Tamotsu Ninomiya, Masahito Shoyama and Richard Tymerski; IEEE Publication 0–7803–5069, Mar. 1998, pp. 404–411.

"New Driving Scheme for Self Driven Synchrynous Rectifiers;" J.A. Cobos, P. Alou, O, Garcis, J. Uceda and M. Rascon; presented at the APEC '99 Fourteenth Annual Applied Power Electronics Conference and Exposition, Mar. 14–18, 1999, Dallas, Texas, pp. 840–846.

* cited by examiner

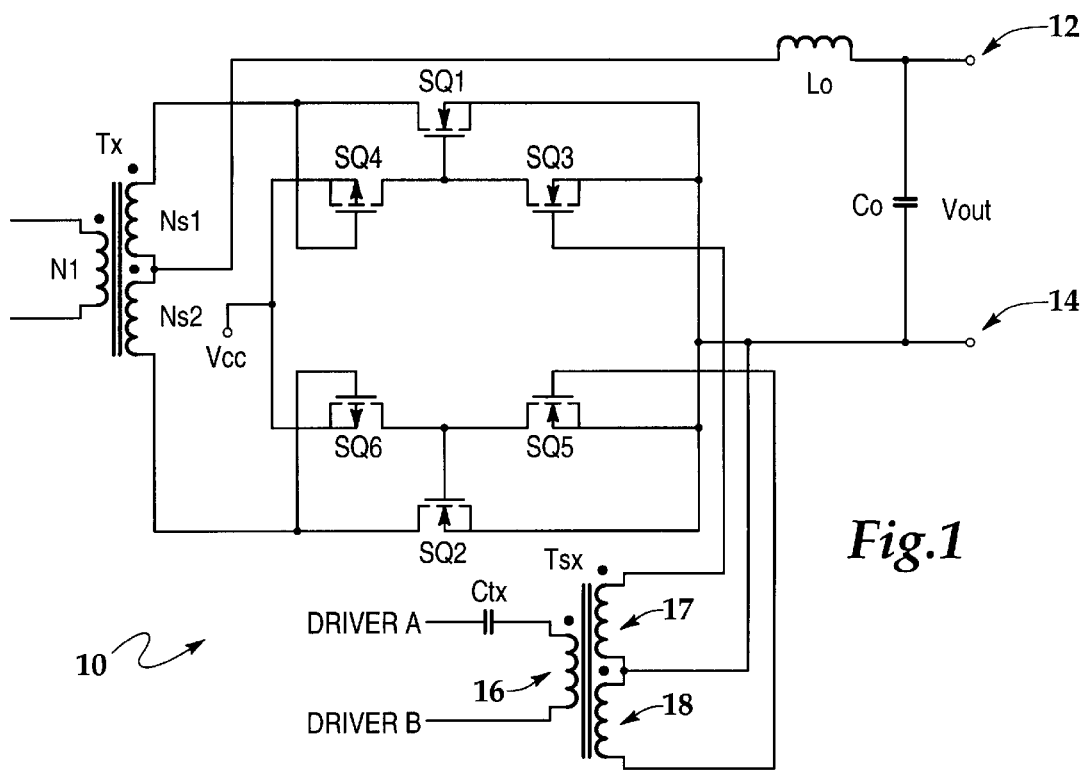
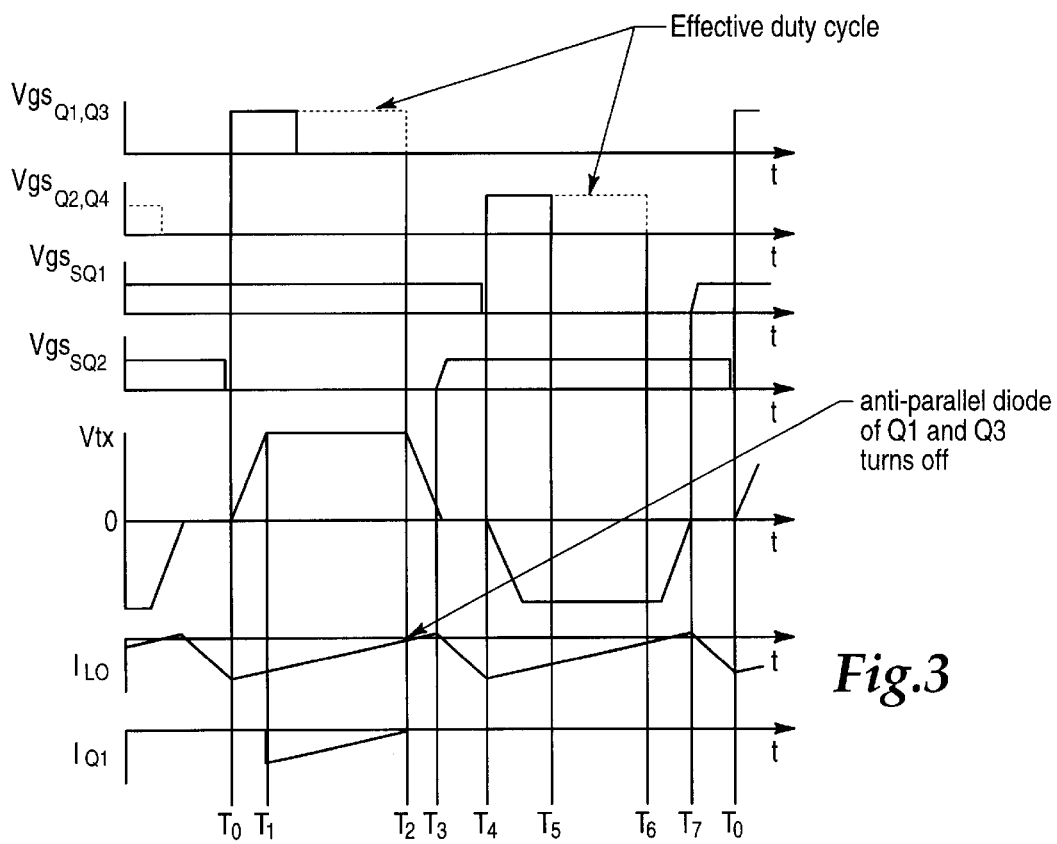
*Fig.1*
*Fig.3*

METHOD OF CONNECTING SYNCHRONOUS RECTIFIER MODULES IN PARALLEL WITHOUT OUTPUT VOLTAGE FAULTS

RELATED APPLICATIONS

This patent application claims the benefit of copending prior filed provisional patent application Ser. No. 60/178,683 filed on Jan. 28, 2000.

FIELD OF THE INVENTION

The present invention is generally directed to voltage converters and, more particularly to a system level solution for overcoming paralleling problems with synchronous rectified modules.

BACKGROUND OF THE INVENTION

The topology selection for the next generation on-board DC/DC converters is driven mainly by the necessity to have high power density. To achieve high power density the efficiency of the non-board DC/DC module has to be maximized. In applications where a large step-down ratio, such as 48V to 5V, 3.3V, 2.5V, etc., is required, the secondary rectifier losses dominate. In order to reduce these losses, synchronous rectification can be used. Synchronous rectification has gained great popularity in the last ten years as low voltage semiconductor devices have advanced to make this a viable technology, as described in the following references: Tabisz, W., Lee, F. C., Chen, D. "A MOSFET Resonant Synchronous Rectifier for High Frequency DC/DC Converters", IEEE PESC 1990 Proceedings, pp. 769–779; Jitaru, I.D., "Constant Frequency, Forward Converter with Resonant Transitions", HFPC 91 Preceedings, pp. 282–292; Cobos, J.A., et al. "Several alternatives for low output voltage on board converters", IEEE APEC 98 Proceedings, pp. 163—169; Bowman, W., Niemela, V.A., "Self-synchronized drive circuit for a synchronous rectifier in a clamped-mode power converter", U.S. Pat. No. 5,590,032, Dec. 31 1996; Loftus, Jr. T.P., "Zero-voltage switching power converter with lossless synchronous rectifier gate drive", U.S. Pat. No. 5,274,543, Dec. 28, 1993; Rozman, A.F., Low loss synchronous rectifier for application to clamped-mode power converters, U.S. Pat. No. 5,625,541, Apr. 29, 1997; Murakarni, N., et al., "A highly efficient, low-profile 300 W power pack for telecommunications systems", IEEE APEC 1994 Proceedings, pp. 786–792; Yamashita, N., Marakami, N.,and Yachi, T., "A compact, highly efficient 50 W on board power supply module for telecommunications systems", IEEE APEC 1995 Proceedings, pp. 297–302; Djekic, O., Brkovic, M., "Synchronous rectifier vs. shottky diodes is a buck topology for low voltage applications", IEEE PESC 1997 Proceedings, pp. 1374–1380; Nakayashiki, et al., "High Efficiency Switching Power Supply Unit with Synchronous Rectifier", IEEE INTELEC 1998 Proceedings, pp. 398–403; Kohama, T., et al., "Analysis of Abnormal Phenomena Caused by Synchronous Rectifiers in a Paralleled Converter System", IEEE INTELEC 1998 Proceedings, pp. 404–411; Svardsjo, C., "Double ended isolated DC-DC converter", U.S. Pat. No. 5,907,481, May 25, 1999; Cobos, J., et al., "New Driving Scheme for Self Driven Synchronous Rectifiers", IEEE APEC 1999 Proceedings, pp. 840–846.

Synchronous rectification adds a new level of complexity to the implementation of DC/DC converters. First, the synchronous rectifiers have to be turned on and off with precise timing. Second, the operation of the rectifier stage using synchronous rectification is not limited to a single quadrant, which complicates the system solution when more than one module is required to operate in a parallel or redundant configuration. Having the ability of placing two or more modules in a parallel configuration is becoming more important as logic voltages continue to decrease and current requirements continue to increase. Therefore, the ability to configure modules in parallel is becoming a necessity.

When typical synchronous rectifier modules are placed in a parallel configuration, one or more of the modules will sink current instead of sourcing it, which causes a fault in the system output bus voltage. The problems encountered when trying to parallel modules using synchronous rectification are well-understood as described in the following reference: Kohama, T., et. al., "Analysis of Abnormal Phenomena Caused by Synchronous Rectifiers in a Paralleled Converter System", IEEE INTELEC 1998 Proceedings, pp. 404–411. Even though the problem is well understood, a simple solution is apparently not available. It is not sufficient to prevent the fault condition during normal or steady state operation. The fault condition also needs to be prevented during start-up and shutdown conditions.

SUMMARY OF THE INVENTION

The present invention provides a simple solution for paralleling modules with synchronous rectification. The present solution takes advantage of the self-correcting properties of the selected system solution. This solution does not try to sense the current through the synchronous rectifiers with the intent of disabling the synchronous rectifiers when this current tries to reverse itself. Disabling the synchronous rectifiers under this condition changes the system behavior considerably since both continuous and discontinuous conduction modes of operation need to be dealt with. These two modes have stability. Furthermore, during light load operation such a system can easily oscillate between theses two modes of operation. The proposed solution avoids all this problems simpler and better overall system solution. The present invention is applicable to push-pull type topologies and other topologies, such as two-switch forward, conventional forward, (no active clamp), etc., as long as the synchronous rectifiers are self-driven.

The present invention provides a method for preventing a fault condition in a DC-DC converter having a first secondary winding coupled to a first synchronous rectifier and a second secondary winding coupled to a second synchronous rectifier. The first synchronous rectifier is turned on based on a voltage across the first secondary winding and is turned off based on a first driver signal. The second synchronous rectifier is turned on based on a voltage across the second secondary winding and is turned off based on a second driver signal.

The present invention also provides a DC-DC converter that includes a primary transformer, a first and second synchronous rectifier, and a first and second control circuit. The primary transformer has a primary winding, a first secondary winding and a second secondary winding wherein the first and second secondary windings coupled together. The first synchronous rectifier is coupled to the first secondary winding and the second synchronous rectifier is coupled to the second secondary winding. The first control circuit is coupled to the first synchronous rectifier, and turns the first synchronous rectifier on based on a voltage across the first secondary winding and turns the first synchronous rectifier off based on a first driver signal. The second control circuit is coupled to the second synchronous rectifier, and turns the second synchronous rectifier on based on a voltage across the second secondary winding and turns the second synchronous rectifier off based on a second driver signal.

In addition, the present invention provides a DC-DC converter that includes a power transformer, a signal transformer, a first and second output terminal, an output inductor, an output capacitor, a biasing voltage terminal, first and second synchronous rectifiers, and first, second, third and fourth switches. The power transformer has a primary winding, a first secondary winding and a second secondary winding wherein the first and second secondary windings coupled together. The signal transformer has a primary winding, a first secondary winding and a second secondary winding wherein the first and second secondary windings coupled together. The second output terminal is coupled to the connection between the first and second secondary windings of the signal transformer. The output inductor is coupled between the connection between the first and second secondary windings of the power transformer and the first output terminal. The output capacitor is coupled between the first and second output terminals. The first synchronous rectifier is coupled between the first secondary winding of the primary transformer and the second output terminal. The first switch is coupled between the biasing voltage terminal and a control of the first synchronous rectifier, a control of the first switch is coupled to the first secondary winding of the primary transformer. The second switch is coupled between the control of the first synchronous rectifier and the second output terminal, a control of the second switch is coupled to the first secondary winding of the signal transformer. The second synchronous rectifier is coupled between the second secondary winding of the primary transformer and the second output terminal. The third switch is coupled between the biasing voltage terminal and a control of the second synchronous rectifier, the control for the third switch is coupled to the second secondary winding of the primary transformer. The fourth switch is coupled between the control of the second synchronous rectifier and the second output terminal, the control for the fourth switch is coupled to the second secondary winding of signal transformer.

Other features and advantages of the present invention will be apparent to those of ordinary skill in the art upon reference to the following detailed description taken in conjunction with the accompanying drawings.

BRIEF SUMMARY OF THE DRAWINGS

The above and further advantages of the invention may be better understood by referring to the following description in conjunction with the accompanying drawings, in which:

FIG. 1 is a schematic diagram of a full-wave rectifier in accordance with one embodiment of the present invention;

FIG. 3 is a graphical illustration of waveforms for the full-bridge converter operating with negative output inductor current in accordance with one embodiment of the present invention;

DETAILED DESCRIPTION OF PREFERRED EMBODIMENTS

Figure 2:
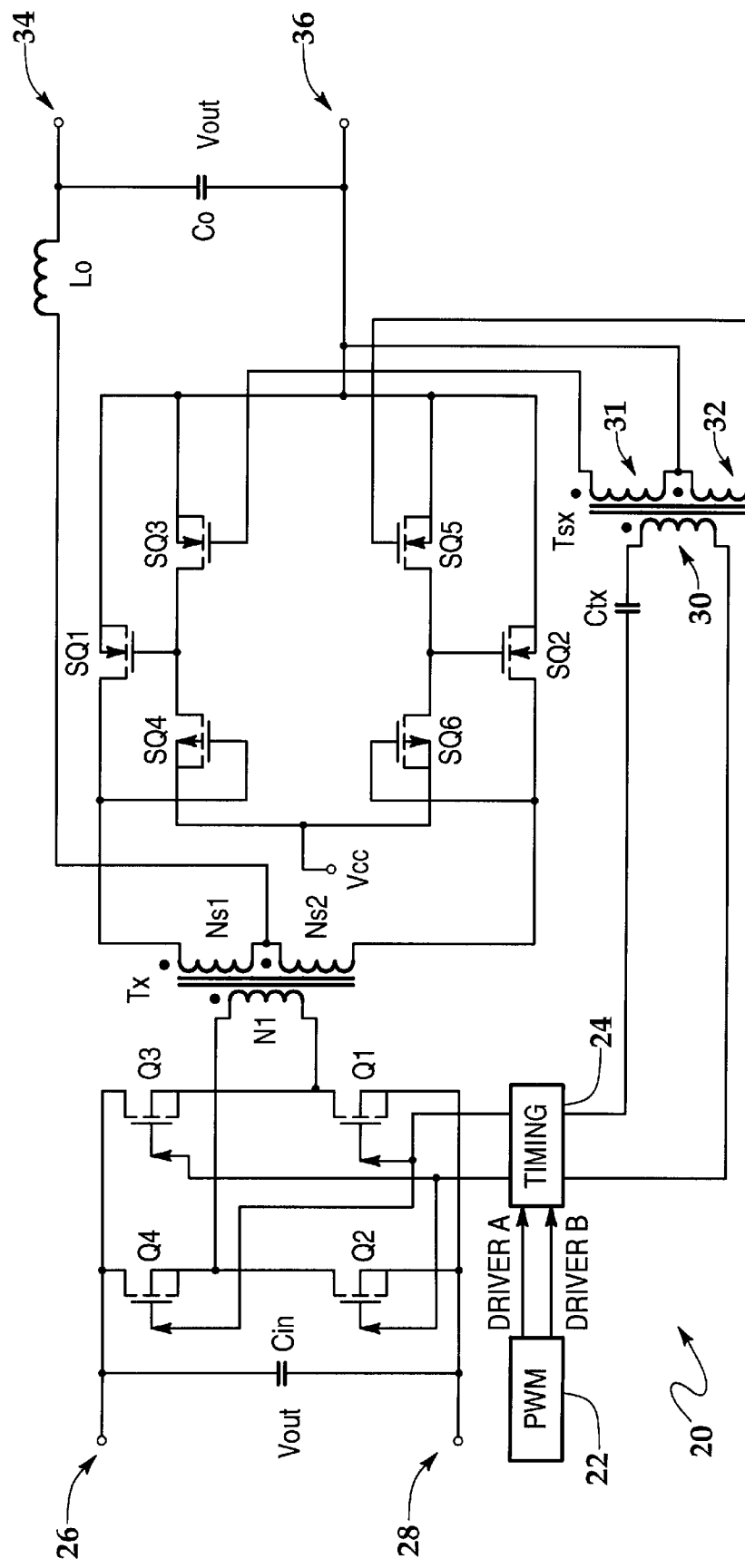
FIG. 2 is a schematic diagram of a full-bridge converter in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates to logic integrated circuits and, more particularly, to a new simplified DC-DC module with synchronous rectification that can be paralleled with other DC-DC modules. As a result, the present invention prevents fault conditions during normal, steady state, start-up and shut down conditions. In addition, the present invention is particularly useful in portable electronic devices, such as computers, personal data assistants and communication devices.

The present invention provides a simple solution for paralleling modules with synchronous rectification. The present solution takes advantage of the self-correcting properties of the selected system solution. This solution does not try to sense the current through the synchronous rectifiers with the intent of disabling the synchronous rectifiers when this current tries to reverse itself. Disabling the synchronous rectifiers under this condition changes the system behavior considerably since we now have to deal with both continuous and discontinuous conduction modes of operation. These two modes have stability. Furthermore, during light load operation such a system can easily oscillate between theses two modes of operation. The proposed solution avoids all this problems simpler and better overall system solution. Computer simulations and an experimental breadboard have been used to verify this concept.

Although, the present invention will first be described in reference to hard-switched push-pull type topologies, the present invention is applicable to other topologies, such as two-switch forward, conventional forward, (no active clamp), etc., as long as the synchronous rectifiers are self-driven. Many different driving schemes for the synchronous rectifiers have been suggested for these types of topologies. For example, it is well recognized that if high efficiency is desired, an externally driving scheme provides the best solution. Such an external driving scheme is described in Svardsjo, C., "Double ended isolated DC-DC converter", U.S. Pat. No. 5,907,481, May 25, 1999, which is hereby incorporated by reference. This type of driving scheme provides the correct driving pulses to insure that both synchronous rectifiers are on during the complete freewheeling cycle. In order to provide the safe paralleling of modules, however, the driving scheme suggested in U.S. Pat. No. 5,907,481 must be modified. U.S. Pat. No. 5,907,481 provides a circuit wherein the timing information to tun-on and tun-off synchronous rectifiers is provided by the primary circuitry via a signal transformer. The present invention also uses a driving scheme wherein the tub-off timing is provided by the primary circuitry via a signal transformer, but unlike U.S. Pat. No. 5,907,481, the turn-on timing is provided by the power transformer.

FIG. 1 is a schematic diagram of a full-wave rectifier 10 in accordance with one embodiment of the present invention that uses the modified driving scheme described above. The full-wave rectifier 10 includes a primary transformer Tx, a signal transformer Tsx, synchronous rectifiers SQ1 and SQ2, switches SQ3, SQ4, SQ5 and SQ6, signal transformer capacitor Ctx, output capacitor Co, and output inductor Lo. The primary transformer Tx has a primary winding N1, and first and second secondary windings Ns1 and Ns2. The first and second secondary windings Ns1, Ns2 are coupled together. The signal transformer Tsx has a primary winding 16, and first and second secondary windings 17 and 18. The first and second secondary windings 17, 18 are coupled together.

The output inductor Lo is coupled between the center tap (between the first and second secondary winding Ns1, Ns2) of the primary transformer Tx and a first output terminal 12. The output capacitor Co is coupled between the first output terminal 12 and the second output terminal 14. The second output terminal 14 is also coupled between the center tap (between the first and second secondary winding 17, 18) of the signal transformer Tsx. The voltage across the first and second output terminals 12, 14 is Vout. The first synchronous rectifier SQ1 is coupled between the first secondary winding Ns1 and the second output terminal 14. Switch SQ4 is coupled between the primary biasing voltage Vcc and the gate of the first synchronous rectifier SQ1, and switch SQ3 is coupled between the gate of the first synchronous rectifier SQ1 and the second output terminal 14. The gate for switch SQ4 is coupled to the first secondary winding Ns1 of the primary transformer Tx. The gate for switch SQ3 is coupled to the first secondary winding 17 of signal transformer Tsx.

The second synchronous rectifier SQ2 is coupled between the second secondary winding Ns2 and the second output terminal 14. Switch SQ6 is coupled between the primary biasing voltage Vcc and the gate of the second synchronous rectifier SQ2, and switch SQ5 is coupled between the gate of the second synchronous rectifier SQ2 and the second output terminal 14. The gate for switch SQ6 is coupled to the second secondary winding Ns2 of the primary transformer Tx. The gate for switch SQ5 is coupled to the second secondary winding 18 of signal transformer Tsx.

The primary winding 16 of the signal transformer Tsx has a first terminal and a second terminal (the high voltage terminal is indicated by the dot). The signal transformer capacitor Ctx is coupled between a Driver A and the first terminal of the primary winding 16 of the signal transformer Tsx. The second terminal of the primary winding 16 of the signal transformer Tsx is coupled to Driver B. As used herein, the gates of the switches and synchronous rectifiers are also referred to as controls. In addition, switches SQ3 and SQ4 are referred to as the first control circuit, and switches SQ5 and SQ6 are referred to as the second control circuit.

As previously mentioned, the turn-off timing of the synchronous rectifiers SQ1 and SQ2 is determined from the signal coming from the primary through the signal transformer Tsx and the turn-on timing is determined from voltage generated by the power transformer Tx. The present invention provides a self-correcting mechanism that prevents the current from building in the opposite direction.

The operation of the circuit 10 under this condition is as follows: as the current through the output inductor Lo decreases and becomes negative, the current through the active switches also changes polarity and now flows through its anti-parallel diode. Therefore, when the primary drive tries to turn-off the primary switches nothing happens since current is in the anti-parallel diode of the switches and positive volt*seconds is applied to the output inductor Lo.

The primary switches will not turn-off until their anti-parallel diode is naturally commutated off. These anti-parallel diodes will finally turn-off when the summation of the reflected load current and the magnetizing current is equal to zero or slightly positive. Since the second synchronous rectifier SQ2 does not turn-on until the transformer voltage vanishes to zero, no conflict condition is developed. This self-correcting mechanism works for push-pull type topologies because the turn-off of the primary switches does not determine the turn-off of the synchronous rectifiers SQ1, SQ2.

Now referring to FIG. 2, a schematic diagram of a full-bridge converter 20 is shown in accordance with one embodiment of the present invention. The full-bridge converter 20 includes a primary transformer Tx, a signal transformer Tsx, primary switches Q1, Q2, Q3, and Q4, synchronous rectifiers SQ1 and SQ2, switches SQ3, SQ4, SQ5 and SQ6, input capacitor Cin, signal transformer capacitor Ctx, output capacitor Co, output inductor Lo, pulse width modulator ("PWM") circuit 22, and timing circuit 24.

The primary transformer Tx has a primary winding N1, and first and second secondary windings Ns1 and Ns2. The first and second secondary windings Ns1, Ns2 are coupled together. The signal transformer Tsx has a primary winding 31, and first and second secondary windings 32 and 33. The first and second secondary windings 32, 33 are coupled together.

The converter 20 receives DC power from a DC source Vdc across a first input terminal 26 and a second input terminal 28. Input capacitor Cin is coupled between the first and second input terminals 26, 28. Primary switch Q4 is coupled between the first input terminal 26 and a first terminal of the primary winding Ni of the primary transformer Tx. Primary switch Q2 is coupled between the first terminal of the primary winding N1 of the primary transformer Tx and the second input terminal 28. Primary switch Q3 is coupled between the first input terminal 26 and a second terminal of the primary winding N1 of the primary transformner Tx. Primary switch Q1 is coupled between the second terminal of the primary winding Ni of the primary transformer Tx and the second input terminal 28. The gates of primary switches Q2 and Q3 are coupled to a first connection of the timing circuit 24. The gates of primary switches Q1 and Q4 are coupled to a second connection of the timing circuit 24. The timing circuit 24 is connected to the PWM 22 via Driver A and Driver B. The primary winding 30 of the signal transformer Tsx has a first terminal and a second terminal (the high voltage terminal is indicated by the dot). The signal transformer capacitor Ctx is coupled between a third connection of the timing circuit 24 and the first terminal of the primary winding 30 of the signal transformer Tsx. The second terminal of the primary winding 30 of the signal transformer Tsx is coupled to a fourth connection of the timing circuit 24.

The output inductor Lo is coupled between the center tap (between the first and second secondary winding Ns1, Ns2) of the primary transformer Tx and a first output terminal 34. The output capacitor Co is coupled between the first output terminal 34 and the second output terminal 36. The second output terminal 36 is also coupled between the center tap (between the first and second secondary winding 31, 32) of the signal transformer Tsx. The voltage across the first and second output terminals 34, 36 is Vout. The first synchronous rectifier SQ1 is coupled between the first secondary winding Ns1 and the second output terminal 36. Switch SQ4 is coupled between the primary biasing voltage Vcc and the gate of the first synchronous rectifier SQ1, and switch SQ3 is coupled between the gate of the first synchronous rectifier SQ1 and the second output terminal 36. The gate for switch SQ4 is coupled to the first secondary winding Ns1 of the primary transformer Tx. The gate for switch SQ3 is coupled to the first secondary winding 31 of signal transformer Tsx.

The second synchronous rectifier SQ2 is coupled between the second secondary winding Ns2 and the second output terminal 36. Switch SQ6 is coupled between the primary biasing voltage Vcc and the gate of the second synchronous rectifier SQ2, and switch SQ5 is coupled between the gate of the second synchronous rectifier SQ2 and the second output terminal 36. The gate for switch SQ6 is coupled to the second secondary winding Ns2 of the primary transformer Tx. The gate for switch SQ5 is coupled to the second secondary winding 32 of signal transformer Tsx.

Referring now to FIG. 3, a graphical illustration of the pertinent waveforms for the full-bridge converter operating with negative output inductor current are shown in accordance with one embodiment of the present invention. This operating condition could develop with two or more modules in parallel where a very loose current sharing scheme is used, or during the turn-on of a module while a second module is already on (module start-up into a working voltage, hot plug-in). For implementations where the external drive circuitry defines both the turn-on and turn-off times of the synchronous rectifiers would conduct as soon as the primary switches turn-off allowing the inductor current to build in the negative direction. Eventually, the inductor current would grow in the negative direction to such a magnitude that the module would fail. Even if the module does not fail this is not a desirable mode of operation from a system point of view.

The modified driving scheme of the present invention provides a self-correcting mechanism as long as the PWM controller is active. Therefore, the PWM needs to remain active under normal conditions. In systems with parallel modules, typical set point mismatches will cause one or more modules to turn-off. The module with the highest reference (set point) will determine the system voltage, causing the remaining modules to shutdown. "Anti-rollback circuits" can be used to avoid this condition. There are many different circuits that have been proposed to solve this problem. Usually, those circuits require a second reference and/or other complex circuitry to prevent the power stage from turning off under this condition. In synchronous rectified type modules, the present invention takes advantage of the fact that these modules always operate in continuous conduction mode and if input voltage feed-forward is implemented, then the signal into the comparator of PWM is well behaved and does not have large excursions. Therefore, a simple anti-rollback circuit can be obtained by bounding this voltage signal. For example, in an application which requires isolation and an opto-coupler is used to transfer the feedback information from the secondary circuit to the primary, the anti-rollback circuit can be implemented as shown in FIG. 4.

Figure 4:
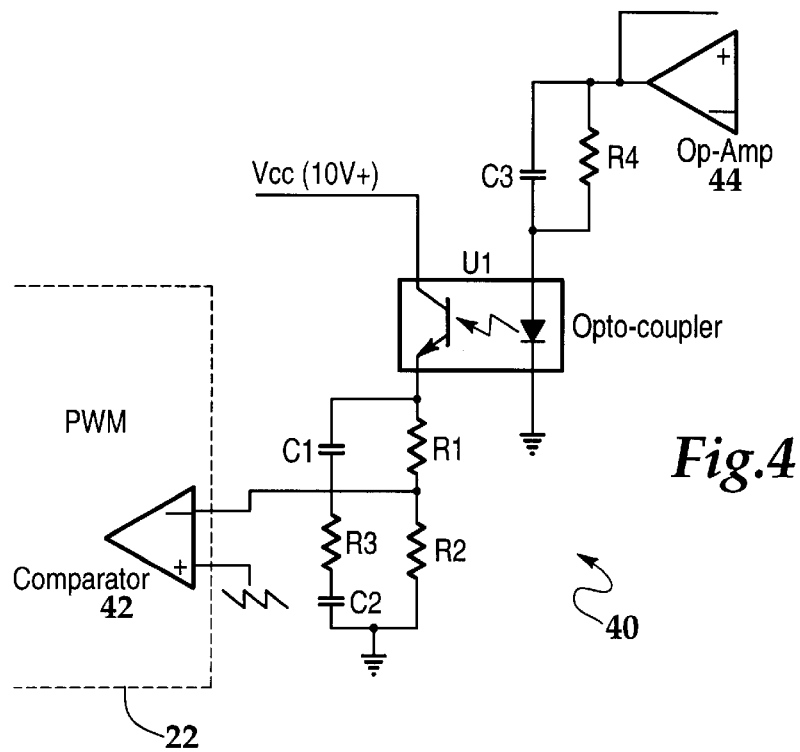
FIG. 4 is a schematic diagram of an anti-rollback circuit for a module with synchronous rectification in accordance with the present invention.

FIG. 4 is a schematic diagram of an anti-rollback circuit 40 for a module with synchronous rectification in accordance with the present invention. The anti-rollback circuit 40 includes an opto-coupler U1, and is connected between a biasing voltage source Vcc and ground. The anti-rollback circuit 40 is also connected to the output of an op-amp 44 and a comparator 42 of a PWM 22. The anti-rollback circuit also includes various biasing resistors R1, R2, R3 and R4, and capacitors C1, C2 and C3. Resister R1 is placed in series with the output stage of the opto-coupler U1 to limit the minimum impedance providing a bounded signal into the PWM comparator 42. The capacitor C1 added in parallel of R1 is needed to maintain the high frequency performance of the converter. This simple modification prevents the module from shutting down even when the main feedback loop is telling the converter to fold back because the output voltage is to high.

If modified driving scheme for a push-pull converter is used in conjunction with an anti-rollback circuit, reverse current conduction through the synchronous rectifiers can be avoided for any condition in which the PWM controller is operating. The present invention will, therefore, prevent reverse current conduction through the synchronous rectifiers during normal operation and during start-up type conditions. This combination will not, however, solve the problem during shutdown, such as when one of the modules is to be turned-off when one or more other modules are to remain on. In this case, the module that is being turned-off will not be able to distinguish between the off states and its typical freewheeling stage and will turn on both synchronous rectifiers causing a short on the output of the modules.

To solve this problem, the present invention includes a circuit that disables the synchronous rectifiers when the module is turned-off via its remote on/off function. This can be a very simple circuit if the remote on/off function is located in the secondary side of the circuit. Unfortunately, in most telecommunication DC/DC modules the on/off function is referenced to the primary circuit. As a result, this would require an additional opto-coupler to transfer this information to the secondary circuit. Opto-couplers are relatively large and unreliable components in a typical DC/DC module. Therefore, a better solution is to have a simple timing circuit that detects when the length of the freewheeling stage has been exceeded and disable the synchronous rectifiers.

Figure 5:
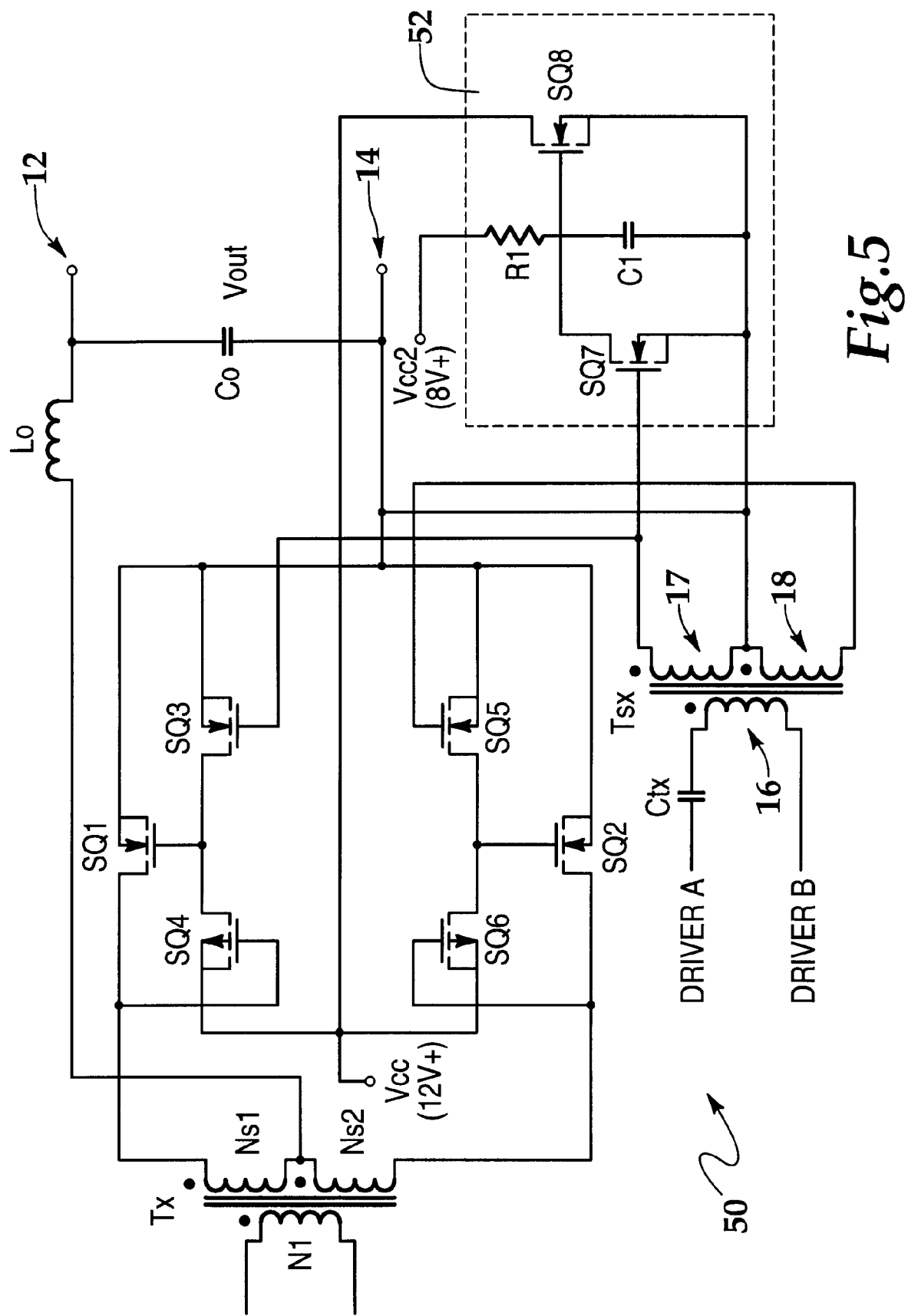
FIG. 5 is a schematic diagram of a timing circuit used to disable a synchronous rectifier drive when timing for the freewheeling stage of the a circuit is executed in accordance with the present invention.

FIG. 5 is a schematic diagram of a rectifier circuit 50 having a timing circuit 52 used to disable a synchronous rectifier drive when timing for the freewheeling stage of the a circuit is executed in accordance with the present invention. Except for the timing circuit 52, the rectifier circuit 50 is identical to the rectifier circuit 10 described in reference to FIG. 1. The timing circuit 52 includes switches SQ7 and SQ8, resistor R1 and capacitor C1 Switch SQ8 is coupled between Vcc and the center tap between the first and second secondary windings 17, 18 of the signal transformer Tsx. Switch SQ7 is coupled between the gate of switch SQ8 and the center tap of the signal transformer Tsx. The gate of switch SQ7 is coupled to the first secondary winding 17 of the signal transformer Tsx. Resistor R1 is coupled between a second biasing voltage source Vcc2 and the gate of switch SQ8. Capacitor C1 is coupled between the gate of switch SQ8 and the center tap between the first and second secondary windings 17, 18 of the signal transformer Tsx. The timing circuit 52 can disable the synchronous rectifiers SQ1, SQ2 within a couple of cycles after the on/off signal has been activated preventing any significant glitches in the system voltage.

The above discussion of the present invention involves the use of a push-pull type topology with modified driving scheme for the synchronous rectifiers having an anti-rollback circuit and either a timing or an on/off controlled circuit that disables the synchronous rectifier during the shut-down. A module in accordance with the present invention can be paralleled with one or more modules without the need of any current sharing. Furthermore, the modules can be turned on and off independently, functionality that is required in hot swap and redundant applications. The present invention also prevents the output inductor current from building in the negative direction when turning on into an established voltage. Finally, a module in accordance with the present invention will recognize when it is placed in an off state.

The concepts disclosed by the present invention can also be applied to other topologies, such as the two-switch forward, conventional forward, (no active clamp), etc. with one distinction: the synchronous rectifiers have to be self-driven. This is, the information to turn on and off the synchronous rectifiers is obtained from the power transformer. In such configurations, the existence of the freewheeling stage allows for the circuit to self-correct and prevents current reversal through the synchronous rectifiers. Unlike the push-pull type topologies, a self-driven scheme is needed to prevent a conflict from developing during this mode of operation between the synchronous rectifiers. That is, the synchronous rectifier drive has to be complementary. Obviously, the concepts disclosed by the present invention also apply to push-pull type converters with self-driven synchronous rectification.

Figure 6:
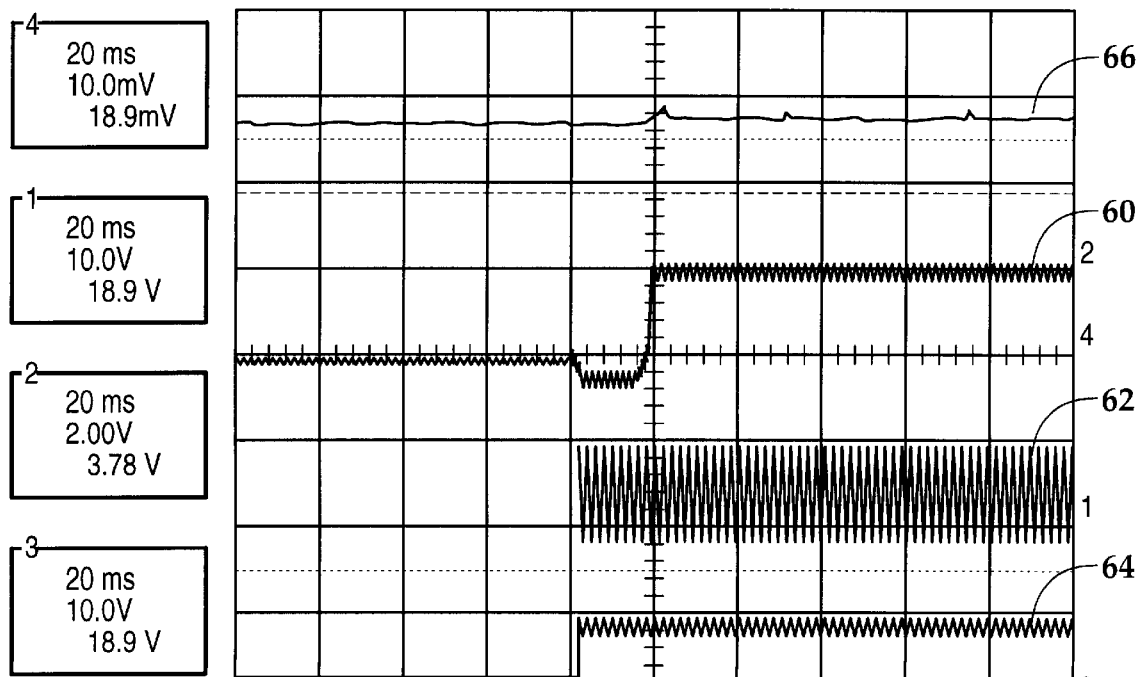
FIG. 6 is an illustration of a 150 W DC/DC module's start up into a working voltage with no active current sharing in accordance with one embodiment of the present invention.

Now referring to FIG. 6, an illustration of an experimental waveform of a 150 W DC/DC module with the full-bridge implementation with the suggested drive circuit starting up to 3.3V output in the absence of an 0-ring diode and active current sharing. The first trace 60 is the synchronous rectifier gate drive (10 V/div). The second trace 62 is the output voltage Vout (2 V/div). The third trace 64 is secondary biasing voltage Vcc (10V/DC). The fourth trace 66 is the output current Io (5 A/div). As shown in FIG. 6, the output current of the DC/DC module goes slightly negative initially, but it does not build up confirming the expected self-correcting characteristics of the present invention.

The primary switches Q1, Q2, Q3 and Q4, synchronous rectifiers SQ1 and SQ2, and switches SQ3, SQ4, SQ5, SQ6, SQ7 and SQ8 are shown as MOSFETs; however, it is contemplated that another type of FET or switching device would be suitable for use in the present invention. Although preferred embodiments of the present invention have been described in detail, it will be understood by those skilled in the art that various modifications can be made therein without departing from the spirit and scope of the invention as set forth in the appended claims.

What is claimed is:

1. A method for preventing a fault condition in a DC-DC converter having a first secondary winding coupled to a first synchronous rectifier and a second secondary winding coupled to a second synchronous rectifier, the method comprising the steps of:

turning the first synchronous rectifier on based on a voltage across the first secondary winding;

turning the first synchronous rectifier off based on a first driver signal;

turning the second synchronous rectifier on based on a voltage across the second secondary winding; and turning the second synchronous rectifier off based on a second driver signal.

2. The method as recited in claim 1, further comprising the step of preventing the converter from shutting down when an output voltage of the converter is too high.

3. The method as recited in claim 1, further comprising the step of disabling the first and second synchronous rectifiers when a freewheeling stage of the converter exceeds a time period.

4. The method as recited in claim 1, wherein the first and second synchronous rectifiers are MOSFETs.

5. A DC-DC converter comprising:

a primary transformer having a primary winding, a first secondary winding and a second secondary winding, the first and second secondary windings coupled together;

a first synchronous rectifier coupled to the first secondary winding;

a second synchronous rectifier coupled to the second secondary winding;

a first control circuit coupled to the first synchronous rectifier, the first control circuit turning the first synchronous rectifier on based on a voltage across the first secondary winding and turning the first synchronous rectifier off based on a first driver signal; and a second control circuit coupled to the second synchronous rectifier, the second control circuit turning the second synchronous rectifier on based on a voltage across the second secondary winding and turning the second synchronous rectifier off based on a second driver signal.

6. The DC-DC converter as recited in claim 5, further comprising an anti-rollback circuit for preventing the converter from shutting down when an output voltage of the converter is too high.

7. The DC-DC converter as recited in claim 6, wherein the anti-rollback circuit comprises an opto-coupler.

8. The DC-DC converter as recited in claim 5, wherein the first control circuit comprises:

a first switch coupled to the first synchronous rectifier and the first secondary winding such that the first synchronous rectifier is turned on based on a voltage across the first secondary winding; and a second switch coupled to the first synchronous rectifier and the first driver signal such that the first synchronous rectifier is turned off based on the first driver signal.

9. The DC-DC converter as recited in claim 8, wherein the first and second switches are MOSFETs.

10. The DC-DC converter as recited in claim 5, wherein the second control circuit comprises:

a third switch coupled to the second synchronous rectifier and the second secondary winding such that the second synchronous rectifier is turned on based on a voltage across the second secondary winding; and a fourth switch coupled to the second synchronous rectifier and the second driver signal such that the second synchronous rectifier is turned off based on the second driver signal.

11. The DC-DC converter as recited in claim 10, wherein the third and fourth switches are MOSFETs.

12. The DC-DC converter as recited in claim 5, further comprising a timing circuit coupled to the first and second control circuits for disabling the first and second synchronous rectifiers when a freewheeling stage of the converter exceeds a time period.

13. The DC-DC converter as recited in claim 5, wherein the first and second synchronous rectifiers are MOSFETs.

14. A DC-DC converter comprising:

a power transformer having a primary winding, a first secondary winding and a second secondary winding, the first and second secondary windings coupled together;

a signal transformer having a primary winding, a first secondary winding and a second secondary winding, the first and second secondary windings coupled together;

a first and second output terminal, the second output terminal coupled to the connection between the first and second secondary windings of the signal transformer;

an output inductor coupled between the connection between the first and second secondary windings of the power transformer and the first output terminal.

an output capacitor coupled between the first and second output terminals;

a biasing voltage terminal;

a first synchronous rectifier coupled between the first secondary winding of the primary transformer and the second output terminal;

a first switch coupled between the biasing voltage terminal and a control of the first synchronous rectifier, a control of the first switch coupled to the first secondary winding of the primary transformer;

a second switch coupled between the control of the first synchronous rectifier and the second output terminal, a control of the second switch coupled to the first secondary winding of the signal transformer;

a second synchronous rectifier coupled between the second secondary winding of the primary transformer and the second output terminal;

a third switch coupled between the biasing voltage terminal and a control of the second synchronous rectifier, the control for the third switch coupled to the second secondary winding of the primary transformer; and a fourth switch coupled between the control of the second synchronous rectifier and the second output terminal, the control for the fourth switch coupled to the second secondary winding of signal transformer.

15. The DC-DC converter as recited in claim 14, further comprising an anti-rollback circuit for preventing the converter from shutting down when an output voltage of the converter is too high.

16. The DC-DC converter as recited in claim 15, wherein the anti-rollback circuit comprises an opto-coupler.

17. The DC-DC converter as recited in claim 14, wherein the first and second synchronous rectifiers are MOSFETs.

18. The DC-DC converter as recited in claim 14, wherein the first, second, third and fourth switches are MOSFETs.

19. The DC-DC converter as recited in claim 14, further comprising a timing circuit coupled to the first and second control circuits for disabling the first and second synchronous rectifiers when a freewheeling stage of the converter exceeds a time period.

20. The DC-DC converter as recited in claim 19, wherein the timing circuit comprises:

a second voltage terminal;

a fifth switch coupled between the biasing voltage terminal and the connection between the first and second secondary windings of the signal transformer;

a sixth switch coupled between a control of the fifth switch and the connection between the first and second secondary windings of the signal transformer, the control of the sixth switch coupled to the first secondary winding of the signal transformer;

a resistor coupled between the second voltage terminal and the control of the fifth switch; and a capacitor coupled between the control of the fifth switch and the connection between the first and second secondary windings of the signal transformer.

* * * * *